(12) United States Patent
Phillips

(10) Patent No.: US 7,108,736 B2
(45) Date of Patent: Sep. 19, 2006

(54) METHOD OF INSTALLING A MOLECULAR SIEVE BED GAS-ENRICHING SYSTEM

(75) Inventor: Robert John Phillips, Honiton (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 65 days.

(21) Appl. No.: 10/646,159

(22) Filed: Aug. 21, 2003

(65) Prior Publication Data

US 2004/0040440 A1    Mar. 4, 2004

(30) Foreign Application Priority Data

Aug. 22, 2002  (GB) ................. 0219548.5
Mar. 20, 2003  (GB) ................. 0306354.2

(51) Int. Cl.
*B01D 53/047*    (2006.01)

(52) U.S. Cl. .............. 95/19; 95/21; 95/26; 95/96; 95/130; 96/114; 96/115; 96/130; 96/133; 55/385.1

(58) Field of Classification Search ........... 95/96–106, 95/130, 19, 21, 26; 96/114, 115, 130–133, 96/143, 144, 147; 55/356, 385.1
See application file for complete search history.

(56) References Cited

U.S. PATENT DOCUMENTS

| | | | | |
|---|---|---|---|---|
| 2,944,627 A | * | 7/1960 | Skarstrom ................. | 95/26 |
| 3,069,830 A | * | 12/1962 | Skarstrom et al. ......... | 95/99 |
| 3,082,166 A | * | 3/1963 | Skarstrom ................. | 208/188 |
| 4,360,362 A | | 11/1982 | Asztalo .................... | 55/21 |
| 4,509,959 A | * | 4/1985 | McCombs ................. | 96/115 |
| 4,584,001 A | * | 4/1986 | Dechene .................. | 96/114 |
| 4,687,013 A | * | 8/1987 | Stevenson ................ | 137/7 |
| 4,732,579 A | * | 3/1988 | Veltman et al. ........... | 95/96 |
| 4,737,170 A | | 4/1988 | Searle ..................... | 55/179 |
| 4,783,205 A | * | 11/1988 | Searle ..................... | 96/111 |
| 4,802,899 A | * | 2/1989 | Vrana et al. ............... | 96/109 |
| 4,880,443 A | | 11/1989 | Miller et al. ............... | 55/26 |
| 5,071,453 A | | 12/1991 | Hradek et al. ............. | 55/21 |
| 5,549,736 A | * | 8/1996 | Coffield et al. ............ | 96/133 |
| 5,766,310 A | * | 6/1998 | Cramer ..................... | 95/96 |
| 5,827,354 A | * | 10/1998 | Krabiell et al. ............. | 95/96 |
| 6,077,331 A | * | 6/2000 | Phillips .................... | 95/12 |
| 6,146,450 A | * | 11/2000 | Duhayer et al. ............ | 96/130 |

(Continued)

FOREIGN PATENT DOCUMENTS

FR    2550466 A1 * 2/1985

(Continued)

*Primary Examiner*—Robert A. Hopkins
(74) *Attorney, Agent, or Firm*—MacMillan, Sobanski & Todd, LLC

(57) ABSTRACT

A method of installing a molecular sieve bed gas enrichment system in a vehicle such as an aircraft. A system controller, a product gas distribution conduit, a high pressure gas supply conduit which extends from a high pressure gas source, and a plurality of molecular sieve beds are installed in the vehicle. Each sieve bed has a first port which delivers product gas through a check valve to an outlet duct. Each sieve bed also includes a second port connected to a valve assembly which is controlled by the system controller to connect the second port either to a gas supply duct during a charging phase or to a venting duct during a venting phase. The outlet duct for each sieve bed is connected to the product gas distribution conduit, and the gas supply duct for each sieve bed is connected to the high pressure gas supply conduit.

12 Claims, 3 Drawing Sheets

U.S. PATENT DOCUMENTS

| | | | |
|---|---|---|---|
| 6,436,175 B1 * | 8/2002 | Coates et al. | 96/126 |
| 6,846,347 B1 * | 1/2005 | Phillips et al. | 95/8 |
| 2002/0121191 A1 * | 9/2002 | Warren | 95/11 |
| 2003/0188635 A1 * | 10/2003 | Lomax et al. | 95/96 |

FOREIGN PATENT DOCUMENTS

| | | |
|---|---|---|
| GB | 2210957 | 6/1989 |
| GB | 2232364 A * | 12/1990 |

* cited by examiner

METHOD OF INSTALLING A MOLECULAR SIEVE BED GAS-ENRICHING SYSTEM

TECHNICAL FIELD

This invention relates to a method of installing a molecular sieve bed gas-enriching system in a vehicle.

Such systems typically include a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed. The invention has been developed particularly but not exclusively for a system for producing oxygen enriched product gas for breathing, in an aircraft.

BACKGROUND OF THE INVENTION

Conventionally in such a system, the beds are operated in pairs or triplets or groups of other numbers of beds, so that when one or more beds of the system are operating in a venting phase, at least one bed is operating in a charging phase, so that oxygen enriched gas is continuously being produced.

It is essential for the integrity of the system, to protect the molecular sieve bed material of the beds from contamination such as particulate contamination, e.g. dust, which is most likely to occur during installation in the aircraft, and from water ingestion which is most likely to occur during storage of the molecular sieve bed material. Also components and fittings for a bed tend to be particular for that bed.

Thus to prevent the likelihood of contamination, water ingestion and the exchanging of components and fittings between the beds, groups of the beds e.g. two beds which are to be operated in tandem, are conventionally provided as modules with all associated valves etc. to enable the material of the bed to be isolated during storage and installation, ready to be plumbed into supply and distribution conduits of the aircraft.

However such modules thus tend to be heavy and difficult to handle during installation and removal e.g. for repair or replacement.

It has been proposed in U.S. Pat. No. 5,549,736 to provide a modular sieve bed so that the area/volume of the sieve bed material available for non-product gas adsorption can be tailored to a desired product gas producing capacity. However, the modules of the arrangement described are assembled by connecting together fittings which provide manifolds for the inlet and outlet gases, such that although the arrangement relieves the problem of overly heavy and bulky multiple bed modules, the molecular sieve bed material is not isolated during and prior to installation of the modules, making contamination and water ingestion a possibility.

BRIEF SUMMARY OF THE INVENTION

According to a first aspect of the invention we provide a method of installing a molecular sieve bed gas-enriching system in a vehicle, the system including a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed, the method including installing in the vehicle a system controller, a product gas distribution conduit which extends to at least one product gas distribution position, and a high pressure gas supply conduit which extends from a high pressure gas source, providing a plurality of molecular sieve bed modules, each module including a container containing molecular sieve bed material, a first gas communication port from the container with an outlet duct for product gas produced in use during the charging phase of the molecular sieve bed, the outlet duct including an outlet valve to prevent ingress of gas into the container through the first gas communication port, and the container including a second gas communication port which is connected to a valve assembly which, depending upon the controlled state of the valve assembly, in use permits of communication between the interior of the container and one of a gas supply duct during the charging phase of the molecular sieve bed and a venting duct during the venting phase of the molecular sieve bed, introducing each of the modules independently into the vehicle, connecting each of the outlet ducts to the product gas distribution conduit, connecting each of the gas supply ducts to the high pressure gas supply conduit, and connecting the controller to each of the valve assemblies of the modules so that the controller is operable in use to change the controlled state of each of the valve assemblies.

Thus by the installation method of the invention, the molecular sieve bed material is isolated in the containers prior to use, reducing the risk of contamination and water ingestion. Moreover the modules include single molecular sieve beds, making them more easy to handle during installation. Not only are the modules smaller than modules including a group of molecular sieve beds, but the single bed modules are lighter too.

The venting ducts of the modules may be connected at least in use of the system, to any low pressure. For example where the vehicle is an aircraft, and the product gas is oxygen enriched gas for breathing, where the system is intended only for use during an emergency situation i.e. cabin decompression, the low pressure may be established in the aircraft cabin or hold such that the venting ducts simply open to the aircraft cabin or hold.

However particularly where it may be desired to operate the system to provide oxygen enriched gas during non-decompression conditions, e.g. for therapeutic purposes, the method of the invention may include connecting each venting duct to a gas venting conduit which extends to a vent outlet from the aircraft or other vehicle, and preferably installing the gas venting conduit prior to introducing the molecular sieve bed modules into the vehicle.

Each of the valve assemblies may include an electrically operated valve which in use responds to a control signal from the controller to assume a controlled state, and the method may include electrically connecting the electrically operated valve to the controller during installation.

To achieve this the method may include installing control cables in the vehicle prior to introducing the modules into the vehicle.

The vehicle may include a gas turbine engine, and the high pressure gas may be bled from the engine although other sources of high pressure gas may be used as desired.

Where the vehicle is an aircraft, the product gas may be oxygen enriched gas.

It is known to operate groups of molecular sieve beds according to various control regimes either to maximise product gas enrichment, and/or vary the degree of enrichment to suit operational conditions. For example in an aircraft at highest altitudes, maximally oxygen enriched gas for breathing would be required, whereas at lower altitudes, less-oxygen enriched gas may be required. Whereas conventionally, where a group of molecular sieve beds have been provided as a module, the beds have been matched to be operated as a group according to a particular control algorithm, according to the method of the invention the controller may be programmed to operate the valve assemblies of the individual molecular sieve bed modules according to any desired control algorithm.

The method may include programming the controller to select a control regime from a plurality of control regimes automatically depending upon the number of molecular sieve bed modules which are operable in the system. Thus a common molecular sieve bed gas-enriching system may be provided for a plurality of applications irrespective of the number of individual molecular sieve beds which are provided. Moreover, in the event of a malfunction of any bed or modules, the controller may be programmed automatically to change the operating regime to operate the remaining operable beds to provide product gas with a desired degree of enrichment.

According to a second aspect of the invention we provide a molecular sieve bed gas-enriching system for a vehicle, the system including a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed, the system further including a system controller, a product gas distribution conduit which extends to at least one product gas distribution position in the vehicle, and a high pressure gas supply conduit which extends from a high pressure gas source of the vehicle, the molecular sieve beds each being provided as a component of a molecular sieve bed module, the module including a container containing molecular sieve bed material, a first gas communication port from the container with an outlet duct for product gas produced in use during the charging phase of the molecular sieve bed, the outlet duct including a valve to prevent ingress of gas into the container through the first gas communication port, and the container including a second gas communication port which is connected to a valve assembly which, depending upon the controlled state of the valve assembly, in use permits of communication between the interior of the container and one of a gas supply duct during the charging phase of the molecular sieve bed and a venting duct during the venting phase of the molecular sieve bed, each of the outlet ducts of the modules being connected to the product gas distribution conduit, and each of the gas supply ducts being connected to the high pressure gas supply conduit, and the controller being connected to each of the valve assemblies of the modules so that the controller is operable in use to change the controlled state of each of the valve assemblies.

According to a third aspect of the invention we provide a vehicle including a molecular sieve bed gas-enriching system installed by a method of the first aspect of the invention.

DETAILED DESCRIPTION OF THE INVENTION

Figure 1:
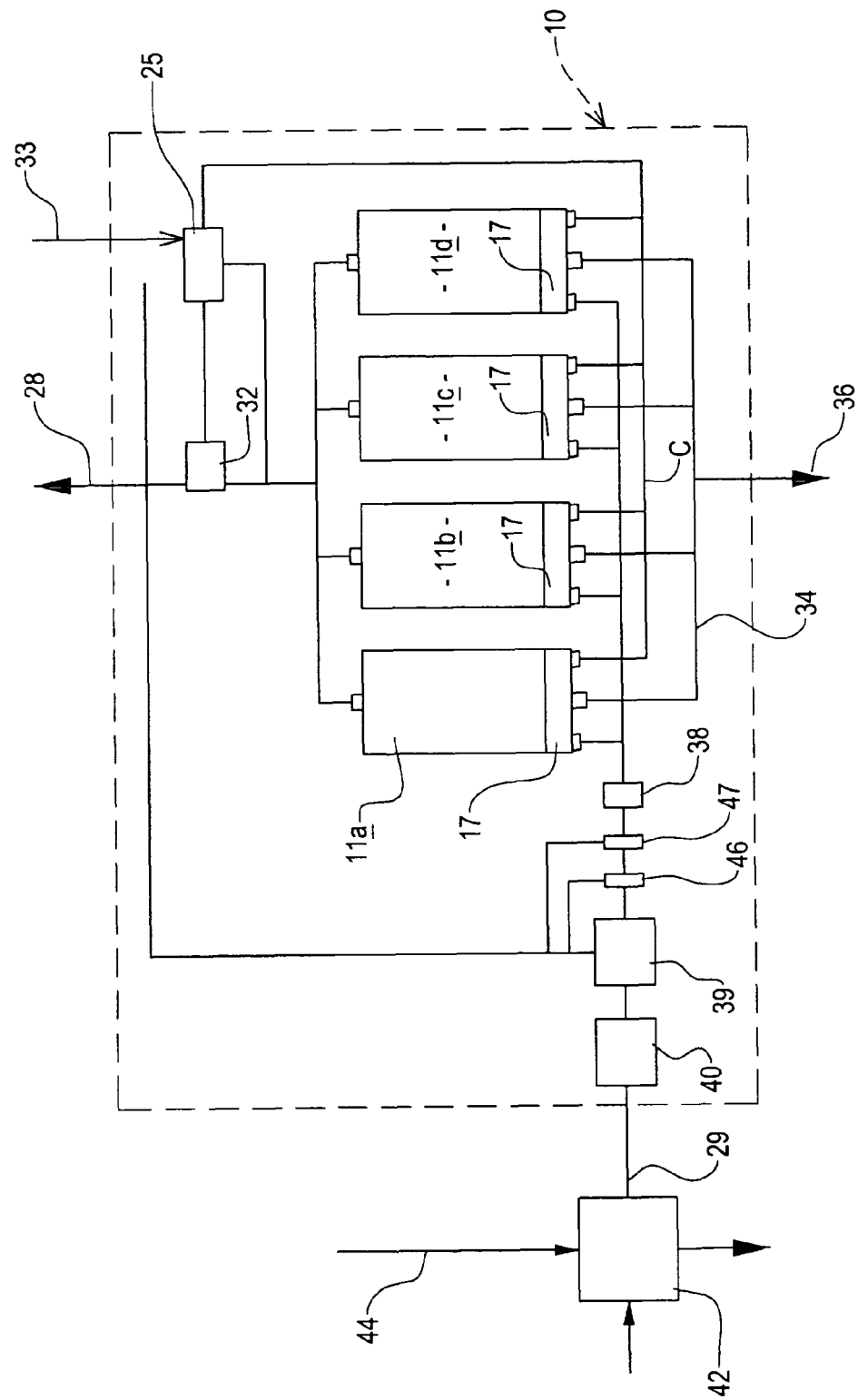
FIG. 1 is an illustrative view of a gas-enriching system for installation by the method of the invention.
Figure 2:
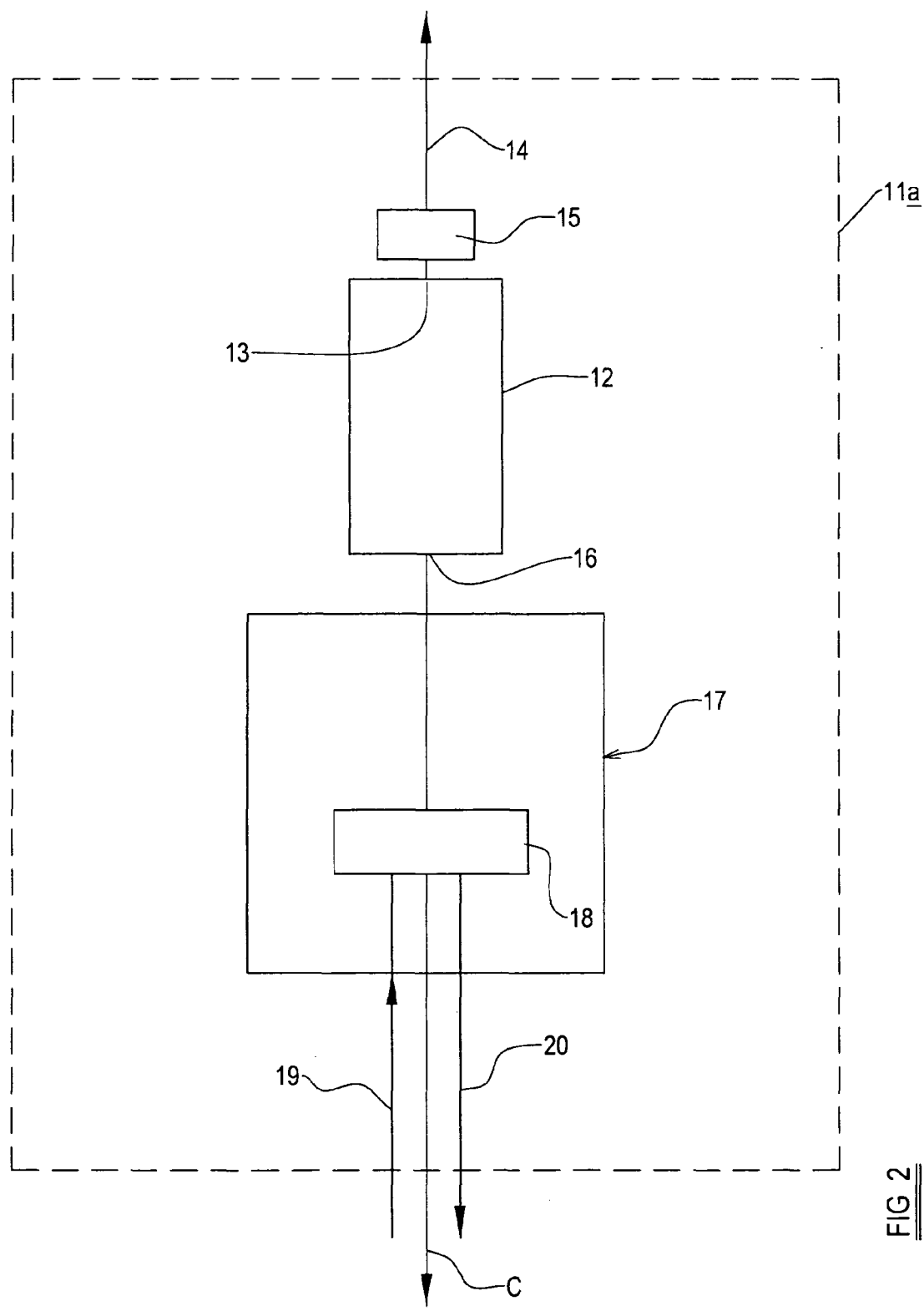
FIG. 2 is an illustrative view of a molecular sieve bed module for use in the system of FIG. 1.

Referring to FIGS. 1 and 2 of the drawings there is shown a molecular sieve bed gas enriching system 10. In this example the system 10 is for producing oxygen enriched gas for breathing, in an aircraft.

The system 10 includes a plurality of molecular sieve bed modules 11a, 11b, 11c etc. which each includes a container 12 containing molecular sieve bed material, in this case, for adsorbing nitrogen from high pressure air. Each container 12 includes a first gas communication port 13 to which is connected an outlet duct 14 for product gas, the outlet duct 14 including an outlet valve 15, which in this example is a simple non-return valve, which closes to prevent the ingress of gas into the container 12 through the first gas communication port 13.

Each container 12 further includes a second gas communication port 16 which is connected to a valve assembly 17. The valve assembly 17 includes an electrically operable valve 18 which in use, and depending on its controlled state, permits of communication between the interior of the container 12 via the second gas communication port 16 and one of a gas supply duct 19 during the charging phase of the molecular sieve bed and a venting duct 20 during the venting phase of the molecular sieve bed.

Thus each module 11a, 11b, 11c etc. is sufficiently small and light to enable the modules 11a, 11b, 11c individually and independently to be readily handled during installation and removal in the system 10 as hereinafter explained.

The electrically operable valves may conveniently be solenoid operated, although motor driven valves could alternatively be used. The valve assemblies 17 may include diaphragm of other valves to ensure complete isolation of the venting ducts 20 from the gas supply ducts 19 during the charging and venting phases of operation.

The system further includes a system controller 25 which is programmed as hereinafter explained to operate the modules 11a, 11b, 11c etc., a product gas distribution conduit 28 which extends to at least one product gas distribution position in the aircraft, such as a face mask for personal breathing, and a high pressure gas supply conduit 29 which extends from a high pressure air supply which in this example is a pressurised air bled from an aircraft engine downstream of an engine turbine which pressurises the air.

The system 10 includes in this example the following additional components namely a product gas isolation valve 32 in the product gas distribution conduit 28, a power supply 33 for the system controller 25, a gas venting conduit 34 which extends to a venting point 36 overboard of the aircraft, a pressure relief valve 38 and a pressure reducing shut off valve 39, each for ensuring that the pressure of the high pressure air supply to the modules 11a, 11b, 11c etc. is within acceptable limits, a water separator 40 for drying the high pressure air supplied, and an inlet valve 42 which enables the high pressure air supply to be derived from alternatively the aircraft engine as described above, or a ram air inlet 44.

The system 10 further includes a high pressure air pressure sensor 46 and a high pressure air temperature sensor 47, both of which provide inputs to the system controller 25 which operates the shut off valve 39 and product gas isolation valve 32.

According to the invention, the system 10 is installed in the aircraft first by installing the system controller 25, the product gas distribution conduit 28 and the high pressure gas supply conduit 29, and all other components of the system 10 including cabling C for connecting the controller 15 to the valves 39, 32 and valve assemblies 17 of the modules, but excluding the modules 11a, 11b, 11c etc. themselves.

The modules 11a, 11b, 11c etc. may then be introduced into the aircraft independently of each other, one at a time as required, by installation engineers handling the modules 11a, 11b, 11c etc. singly.

The modules 11a, 11b, 11c etc. are then individually connected into the remainder of the system 10 by connecting the outlet ducts 14 to the product gas distribution conduit 28, and the gas supply ducts 19 to the high pressure gas supply conduit 29, and by connecting the valve assemblies 17 to the system controller 25 via the cables C.

Preferably the ducts and conduits are provided with connectors which enable the modules 11a, 11b, 11c etc. readily to be connected, and the valve assemblies 17 and cables are also provided with plug and socket connectors which enable ready connection between them. The modules 11a, 11b, 11c etc. may also need be mechanically secured to the aircraft.

Also, where an overboard venting point 36 is provided the vent ducts 20 will need to be connected to the venting conduit 34.

The system controller 25 in this example is programmed to perform a self test to determine how many modules 11a, 11b, 11c etc. are operatively connected in the system 10, and then the controller selects an appropriate system control regime to that product gas with a desired degree of oxygen enrichment for operating conditions is produced.

For example, where an even number of modules 11a, 11b, 11c etc. is provided, the modules 11a, 11b, 11c etc. may be operated in pairs in tandem with the module of each pair being operated in a charging phase for 50% of a time cycle and in a venting phase for 50% of the time cycle, the time cycle being fixed or variable depending upon operating conditions.

In another example, the modules 11a, 11b, 11c etc. may be operated in groups of different numbers, e.g. groups of three with each module charging for 33.3% of the cycle time and venting for 66.6% of the time cycle.

Whatever operating regime is selected by the controller 25, in the event that one or more of the modules 11a, 11b, 11c etc. malfunctions, for example as a result of the molecular sieve bed material becoming contaminated, the controller 25 may bring the module off-line and select an alternative operating regime to produce product gas with a desired degree of oxygen enrichment.

Various modifications may be made without departing from the scope of the invention. Particularly the invention is not limited to a system 10 for use in an aircraft but may be used in any vehicle where it is desired to produce gas enriched product gas for breathing or otherwise. For example it may be desired to produce a nitrogen enriched product gas from air for use in providing a non-flammable atmosphere for a fuel tank.

The system 10 may include additional components not shown in the drawings or mentioned for the full performance of the system 10, as will be apparent to those skilled in the art, but preferably, all components except the modules 11a, 11b, 11c etc. are installable in the aircraft or other vehicle independently of the modules.

Figure 3:
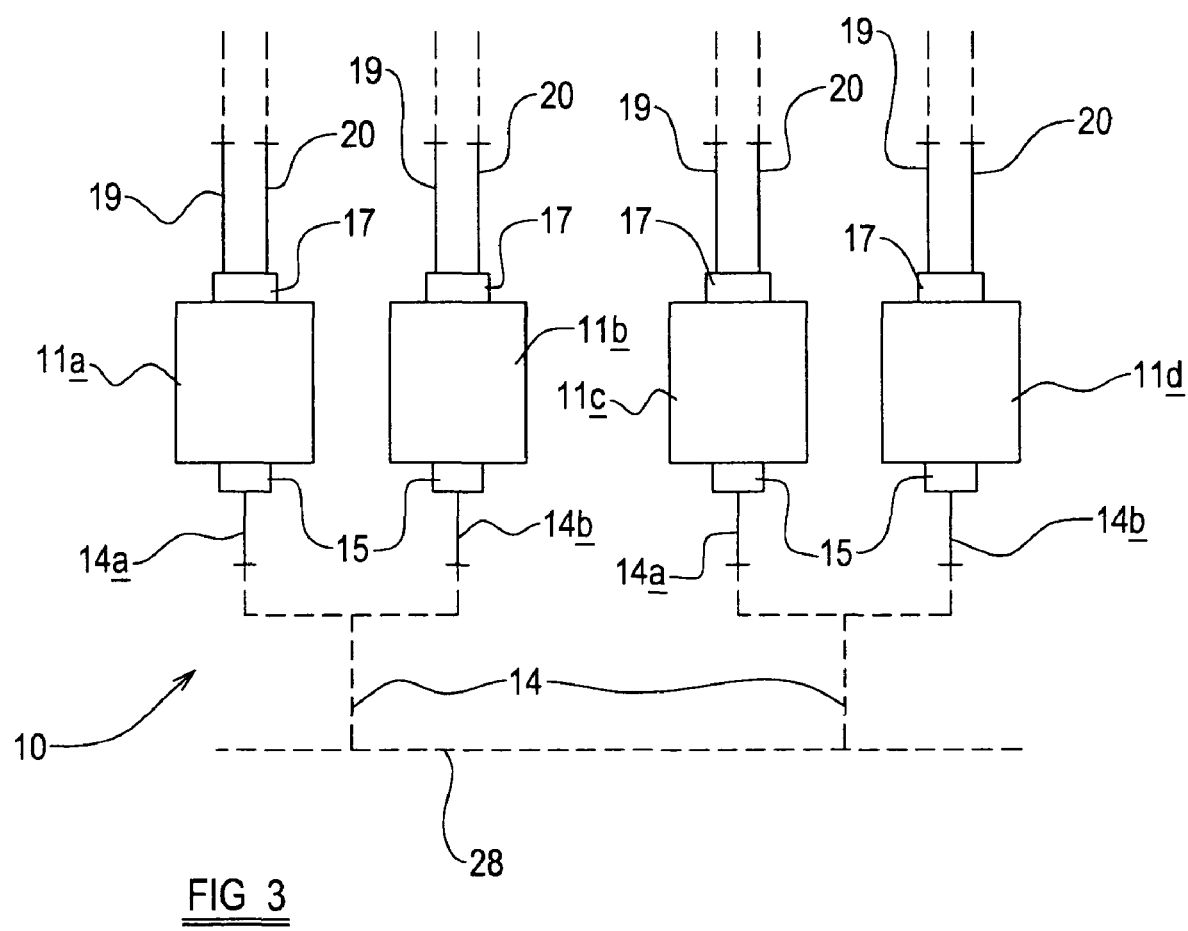
FIG. 3 is an illustrative view of a part of a modified system installed by the method of the invention.

In FIG. 3 there is shown a modified system 10 installed by the method of the invention. In this example the individual modules are arranged in the system 10 in pairs, 11a, 11b and 11c, 11d, with each pair of modules 11a, 11b and 11c, 11d having respective product gas outlet ducts 14a, 14b which are connected together and to a main product gas duct 14, which extends to and is connected to the product gas distribution conduit 28. Thus the outlet ducts 14a, 14b of all of the beds 11a, 11b, 11c, 11d are all, indirectly, connected to the product gas distribution conduit 28.

In this embodiment, the paired beds 11a, 11b and 11c, 11d may be operated as a pair with each bed 11a, 11b of a pair being operated in a charging phase, whilst the other bed of the pair is vented. However, the beds of the pairs may be operated with other beds or pairs of beds of the system 10 by the controller (not seen in FIG. 3) as and when required. Otherwise the beds 11a, 11b and 11c, 11d are operated similarly to the beds in the previously described embodiment.

By coupling beds in distinct pairs, as indicated in FIG. 3, rather than coupling the individual beds direct to the product gas distribution line 28, it is expected that improved purging of a bed being vented (regenerated) may result.

The invention claimed is:

1. A method of installing a molecular sieve bed gas enriching system in a vehicle, the system including a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed, the method including installing in the vehicle a system controller, a product gas distribution conduit which extends to at least one product gas distribution position, and a high pressure gas supply conduit which extends from a high pressure gas source, providing a plurality of molecular sieve bed modules, each module including a container containing molecular sieve bed material, a first gas communication port from the container wit an outlet duct for product gas produced in use during the charging phase of the molecular sieve bed, the outlet duct including an outlet valve to prevent ingress of gas into the container through the first gas communication port, and the container including a second gas communication port which is connected to a valve assembly which, depending upon the controlled state of the valve assembly, in use permits of communication between the interior of the container and one of a gas supply duct during the charging phase of the molecular sieve bed and a venting duct during the venting phase of the molecular sieve bed, introducing each of the modules independently into the vehicle, connecting each of the outlet ducts to the product gas distribution conduit, connecting each of the gas supply ducts to the high pressure gas supply conduit, and connecting the controller to each of the valve assemblies of the modules so that the controller is operable in use to change the controlled state of each of the valve assemblies.

2. A method according to claim 1 wherein each of the venting ducts is connected at least in use of the system, to a low pressure.

3. A method according to claim 1 which includes connecting each venting duct to a gas venting conduit which extends to a vent outlet from the vehicle.

4. A method according to claim 1 wherein each of the valve assemblies includes an electrically operated valve which in use responds to a control signal from the controller to assume a controlled state, and the method includes electrically connecting the electrically operated valve to the controller during installation.

5. A method according to claim 4 wherein the method includes installing control cables in the vehicle prior to introducing the modules into the vehicle.

6. A method according to claim 1 wherein the vehicle includes a gas turbine engine, and the high pressure gas is bled from the engine.

7. A method according to claim 6 wherein the vehicle is an aircraft and the product gas is oxygen enriched gas.

8. A method according to claim 1 wherein the method includes programming the controller to operate the valve assemblies of the molecular sieve bed modules according to a control algorithm.

9. A method according to claim 8 wherein the method includes programming the controller to select a control regime from a plurality of control regimes automatically depending upon the number of molecular sieve bed modules which are operable in the system.

10. A molecular sieve bed gas enriching system for a vehicle, the system including a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed, the system further including a system controller, a product gas distribution conduit which extends to at least one product gas distribution position in the vehicle, and a high pressure gas supply conduit which extends from the high pressure gas supply of the vehicle, the molecular sieve beds each being provided as a component of a molecular sieve bed module, each module including a container containing molecular sieve bed material, a first gas communication port from the container with an outlet duct for product gas produced in use during the charging phase of the molecular sieve bed, the outlet duct including a valve to prevent ingress of gas into the container through the first gas communication port, and the container including a second gas communication port which is connected to a valve assembly which, depending upon the controlled state of the valve assembly, in use permits of communication between the interior of the container and one of a gas supply duct during the charging phase of the molecular sieve bed and a venting duct during the venting phase of the molecular sieve bed, each of the outlet ducts of the modules being connected to the product gas distribution conduit, and each of the gas supply ducts being connected to the high pressure gas supply, and the controller being connected to each of the valve assemblies of the modules so that the controller is operable in use to change the controlled state of each of the valve assemblies.

11. In a vehicle including a molecular sieve bed gas enriching system, the system including a plurality of molecular sieve beds each of which is operable in a charging phase to adsorb non-product gas from a high pressure gas supply, and in a venting phase when the sieve bed is connected to a low pressure, to release adsorbed non-product gas from the molecular sieve bed, a method including installing in the vehicle a system controller, a product gas distribution conduit which extends to at least one product gas distribution position, and a high pressure gas supply conduit which extends from a high pressure gas source, providing a plurality of molecular sieve bed modules, each module including a container containing molecular sieve bed material, a first gas communication port from the container with an outlet duct for product gas produced in use during the charging phase of the molecular sieve bed, the outlet duct including an outlet valve to prevent ingress of gas into the container through the first gas communication port, and the container including a second gas communication port which is connected to a valve assembly which, depending upon the controlled state of the valve assembly, in use permits of communication between the interior of the container and one of a gas supply duct during the charging phase of the molecular sieve bed and a venting duct during the venting phase of the molecular sieve bed, introducing each of the modules independently into the vehicle, connecting each of the outlet ducts to the product gas distribution conduit, connecting each of the gas supply ducts to the high pressure gas supply conduit, and connecting the controller to each of the valve assemblies of the modules so that the controller is operable in use to change the controlled state of each of the valve assemblies.

12. A method according to claim 11 in which the vehicle is an aircraft.

* * * * *